(12) United States Patent
Zimmer et al.

(10) Patent No.: US 7,822,960 B2
(45) Date of Patent: Oct. 26, 2010

(54) PLATFORM MANAGEMENT PROCESSOR ASSISTED RESUME

(75) Inventors: Vincent J. Zimmer, Federal Way, WA (US); Michael A. Rothman, Puyallup, WA (US); David C. Estrada, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 11/644,408

(22) Filed: Dec. 22, 2006

(65) Prior Publication Data

US 2008/0155247 A1 Jun. 26, 2008

(51) Int. Cl.
*G06F 9/00* (2006.01)
*G06F 17/30* (2006.01)
(52) U.S. Cl. .................................. 713/1; 713/2; 726/2
(58) Field of Classification Search ........................ 713/2

See application file for complete search history.

(56) References Cited

U.S. PATENT DOCUMENTS

| 6,256,252 | B1* | 7/2001 | Arimoto .................... 365/227 |
| 6,571,333 | B1* | 5/2003 | Jain et al. ........................ 713/2 |
| 7,284,136 | B2* | 10/2007 | Zimmer et al. .............. 713/300 |
| 7,546,447 | B2* | 6/2009 | Chen et al. ..................... 713/1 |
| 2004/0148536 | A1* | 7/2004 | Zimmer et al. .............. 713/323 |

\* cited by examiner

*Primary Examiner*—Suresh K Suryawanshi
(74) *Attorney, Agent, or Firm*—Joni D. Stutman

(57) ABSTRACT

In some embodiments, the invention involves system and method for resuming from sleep mode using protected storage accessible to an embedded controller. The boot script information is stored in memory that is available only to the embedded controller. Neither the firmware nor OS have access to the boot script. Upon a wake event, the embedded controller either plays the boot script itself, or sends the information to firmware for processing. Other embodiments are described and claimed.

16 Claims, 3 Drawing Sheets

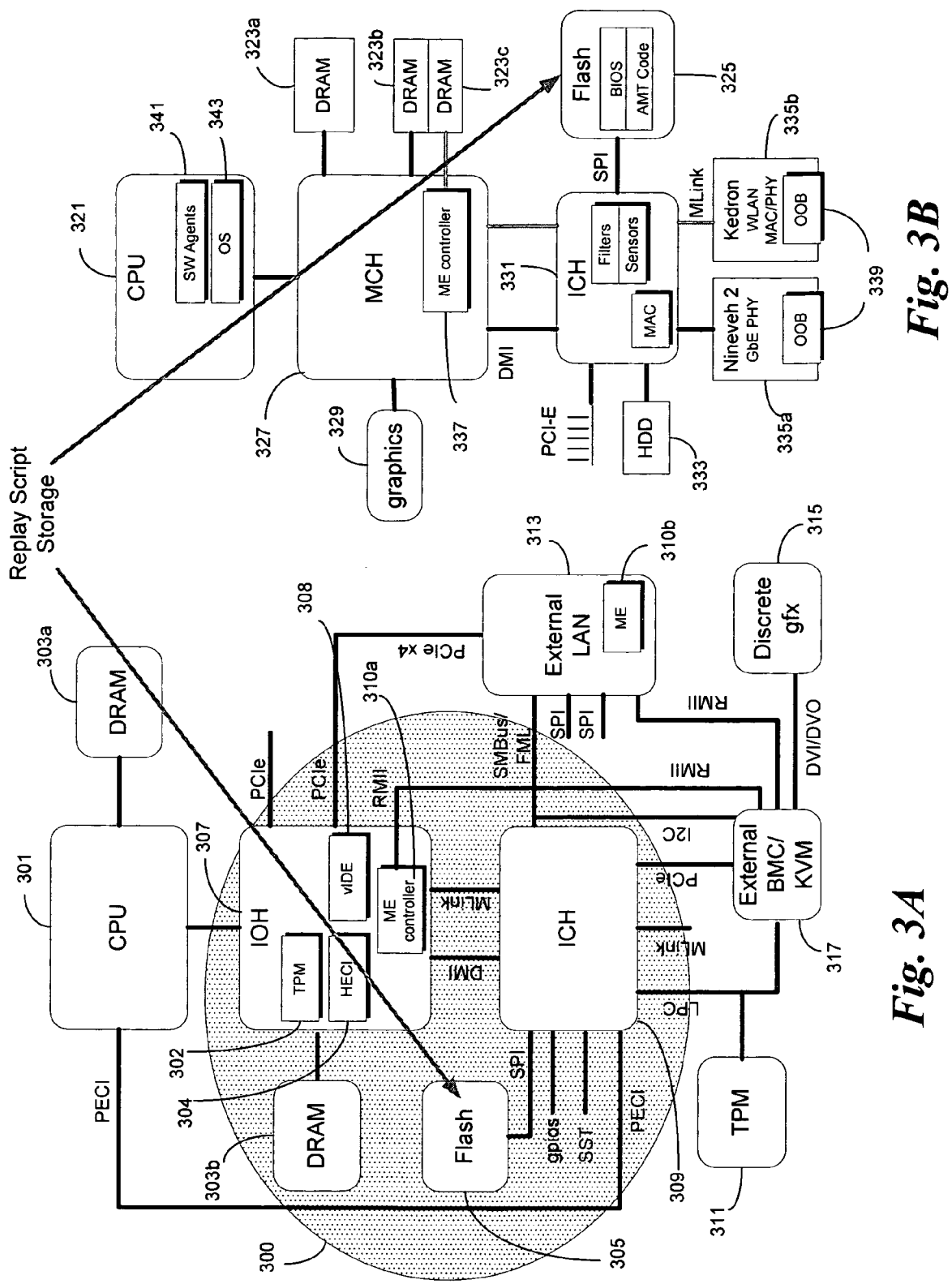

US 7,822,960 B2

PLATFORM MANAGEMENT PROCESSOR ASSISTED RESUME

FIELD OF THE INVENTION

An embodiment of the present invention relates generally to computing devices having power management capabilities and, more specifically, to a system and method for resuming from sleep mode using protected storage accessible to an embedded controller.

BACKGROUND INFORMATION

Various mechanisms exist for resuming a system from a sleep mode. The Advanced Configuration Power Interface (ACPI) defines sleep modes for existing systems. The current specification for ACPI may be found at www*acpi*info. Note that periods have been replaced with asterisks in URLs identified in this document to avoid inadvertent hyperlinks. Existing systems typically implement S3 sleep mode with the basic input output system (BIOS) and store the replay script in ACPI non-volatile store (NVS), which is really just reserved memory, along with the wake vector, or the address within the operating system (OS) to return control. Attacks against ACPI Source Language (ASL) code and infrastructure have been noted that could put the integrity of the system at risk.

BRIEF DESCRIPTION OF THE DRAWINGS

The features and advantages of the present invention will become apparent from the following detailed description of the present invention in which:

FIG. 3A is a block diagram illustrating an exemplary server platform, according to embodiments of the invention; and FIG. 3B is a block diagram illustrating an exemplary client platform, according to embodiments of the invention.

DETAILED DESCRIPTION

An embodiment of the present invention is a system and method relating to utilizing an embedded controller to assist in the power-wake resume processing of a system. In some embodiments, the embedded controller is a manageability engine (ME) controller having Advanced Management Technology (AMT) capabilities. In addition to achieving additional parallelism, logic to implement the AMT capabilities may also promote the integrity of the infrastructure used to effect S3 resume processing (such as the replay script). Even for normal boots, ACPI and the associated ACPI Machine language (AML) code/tables in memory are vulnerable. Embodiments of the present invention may be used to promote the integrity of the tables and signal a pre-operating system (OS) or OS runtime alert (locally) or pre-/post-OS remotely (to the management console) in case of a compromise. Some issues and risks involving the ACPI rootkit are outlined in a presentation from the Black Hat briefings in Europe 2006 and may be found at www*blackhat*com/presentations/bh-europe-06/bh-eu-06-Heasman.pdf. Embodiments of the present invention make a platform less vulnerable to attacks to the BIOS and OS.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
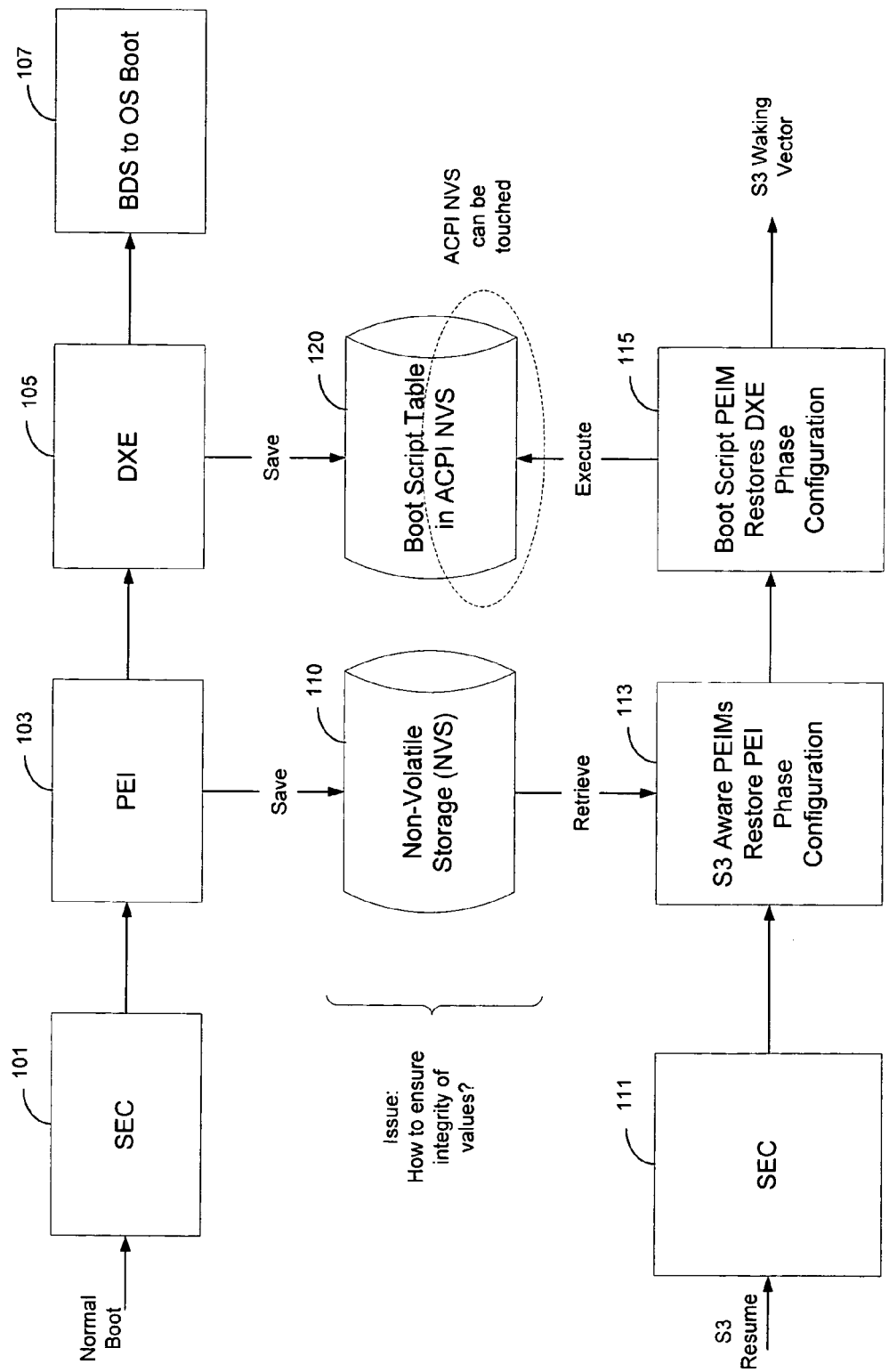
FIG. 1 is a block diagram illustrating a normal boot and wake cycle, according an exemplary system in an extensible firmware interface (EFI) architecture.

Embodiments of the invention conjoin the module S3 resume architecture of, for instance, the Intel® Platform Innovation Framework for the Extensible Firmware Interface (EFI) with the Intel® server processor technology, or Intel® Active Management Technology (iAMT). More information about the Unified EFI (UEFI) architecture may be found on the public Internet at www*uefi*org. Referring to FIG. 1, there is shown a block diagram illustrating a normal boot and wake cycle, according to an exemplary system having an EFI architecture. In existing systems, S3 resume is wholly implemented on the in-band host processor. In existing systems, when a platform is booted, the security (SEC) process 101 is performed. The SEC process transitions to the pre-EFI (PEI) process 103. During PEI, memory settings may be saved in non-volatile storage (NVS) 110 (the UEFI variable typically).

Once PEI is complete, the driver execution environment (DXE) 105 process is performed. DXE may save the I/O controller settings as part of a boot script table in the ACPI NVS at 120. This boot script comprises a set of actions that must be replayed upon a wake event (S3 restart) to bring the system back to the state it was in before going into sleep mode. A typical boot script will restore I/O device and CPU state information. For instance, the memory controller needs to be brought out of its self refresh state, and the disk controller must be programmed back to the appropriate state. It will be understood by those of skill in the art that waking the platform requires only a subset of those actions performed during a normal boot. Additional boot script specifications may be found on the public Internet at www*intel*com/technology/framework/download.htm, specifically at ftp://download.intel.com/technology/framework/docs/Boot-Script_0-91.pdf.

The OS typically stores the resume vector in ACPI NVS 120. However, this value may not be secure and is vulnerable to malicious modification in existing systems. In most systems, the term "ACPI NVS" is a misnomer in that this storage is really memory and not on a disk or other non-volatile media. However, this "NVS" memory may be persistent until there is complete loss of power to the platform, even in the case of a shutdown. The ACPI NVS is somewhat protected from being accessed by the operating system (OS) and user applications by utilizing the ACPI tables and designating the memory as reserved. However, the ACPI NVS is still vulnerable to modification by sophisticated hackers and malware. In fact, the ACPI NVS memory is fully vulnerable to the OS once control has been passed off after booting. The boot device section (BDS) process is performed in 107 and then launches the OS.

Upon a resume from S3 mode, SEC 111 is performed. S3 aware PEI modules (PEIMs) restore the PEI phase configuration from the NVS 110 in 113. The boot script PEIM restores the DXE phase configuration from the ACPI NVS in 115. Once these values have been restored, the S3 waking vector is invoked.

Also, other implementations, such as the host processor hash or decrypt of the NVS on a resume suffer from the latency induced therein. This is troublesome, especially as the S3 processing time budget for the in-band BIOS has gone from 500 ms to 70 ms for most competitive implementations. Embodiments of the present invention use a secure storage architecture for boot script and wake information. Latency may be reduced by offloading some of the wake tasks, as described below.

Figure 2:
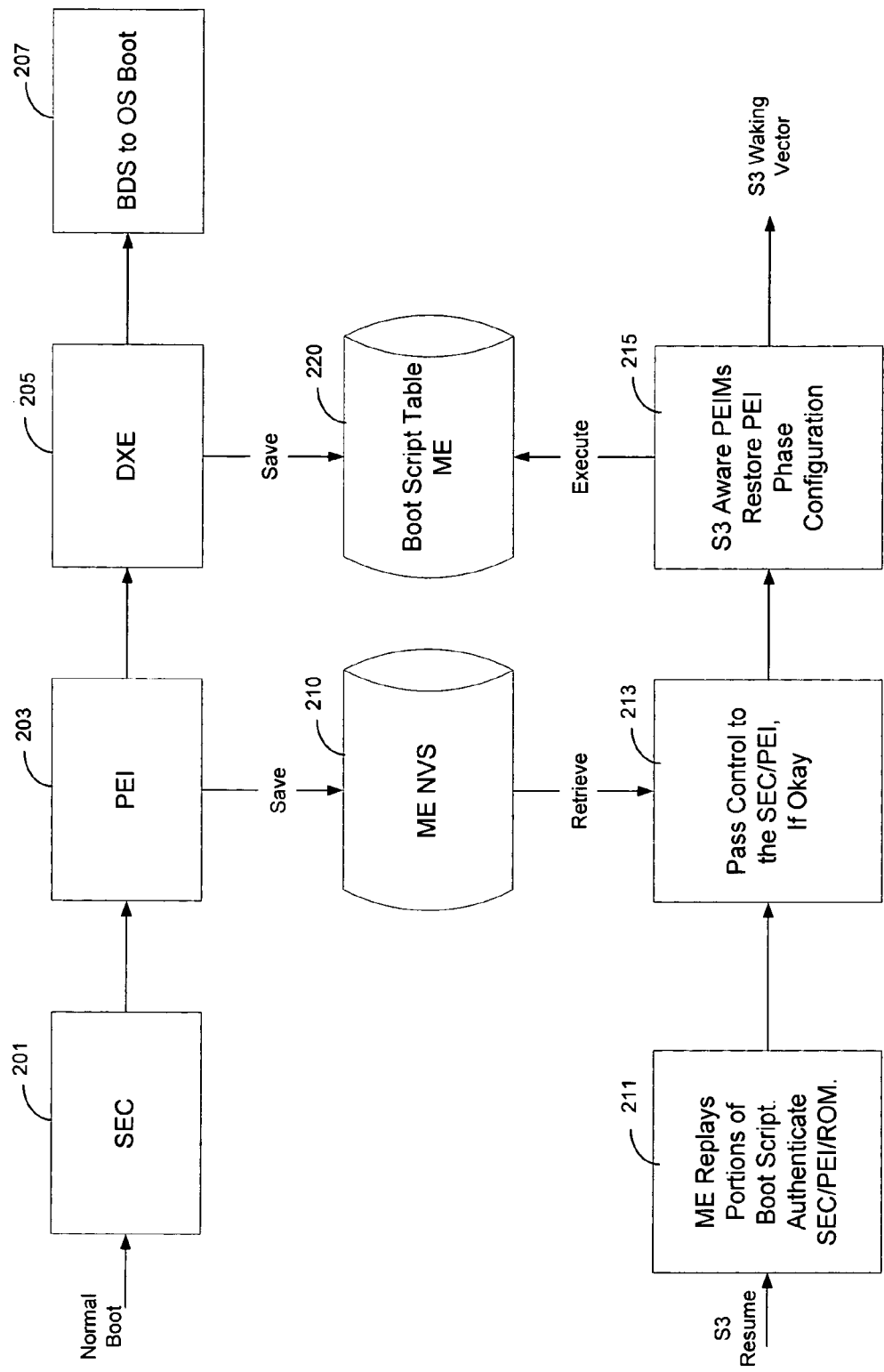
FIG. 2 is a block diagram illustrating a boot and wake cycle, according to embodiments of the invention.

Referring now to FIG. 2, there is shown a block diagram illustrating a boot and wake cycle, according to embodiments of the invention. Instead of storing the boot script data in ACPI NVS, the boot script information (and other information necessary for resuming the platform) may be stored in secure storage only available to an active management technology (AMT) processor, also referred to herein as a manageability engine controller. The manageability engine (ME) controller may assist this process, as discussed further below. The SEC process 201 transitions to PEI 203. PEI 203 may store all or portions of the initialization information in the ME NVS 210, to be discussed further below. DXE 205 may store the boot script table in ME memory store 220. The boot device selection (BDS) phase then proceeds and the OS is launched in 207. Upon a resume (or wake), the ME controller replays portions of the boot script in 211. The SEC/PEI/ROM authenticates the boot script. Control is passed to the SEC/PEI in 213 and retrieves the stored information from the ME NVS 210. S3 aware PEIMs restore the PEI phase configuration to execute the boot script table stored in 220, at block 215. An advantage of using an ME controller to control the wake/resume process is that PEI is used to restore memory controller state on an S3. If this information is stored in a regular UEFI variable, then the OS or other software could possibly corrupt it. After restoring the phase configuration information, the S3 waking vector (resume vector) is then launched to restore the system from sleep mode. The ME controller may confirm that the wake vector has not been tampered with.

Upon resume, the ME controller may execute the boot script and program portions of the chipset. In the alternative, the ME controller may pass the values for execution to EFI code for execution. In either case, the ME controller has the only access to the boot script and boot/wake vector. Thus, it will not be possible for the BIOS/firmware or OS to corrupt the values upon waking. In one embodiment, the boot script and other configuration information is encrypted before being stored in the protected memory. The ME controller, or embedded controller, may be the only entity that has a decryption key to decrypt the information. Thus, the BIOS and OS cannot resume from S3 sleep without the assistance of the embedded controller, and the data is guarded from tampering. In one embodiment, the key is embedded in the ME controller in a bit mask one time programmable fuse.

The ME controller, also known simply as the manageability engine (ME), is integrated into the platform. In some embodiments, the ME may perform other manageability functions, also known as AMT capabilities. However, this functionality is not required to practice embodiments of the invention, as described herein. For purposes of this discussion, the terms ME and AMT controller refer to the physical controller and not to the capabilities of the platform. The ME can typically access the chipset registers through internal data paths or system bus (SMBUS) or PECI accessors.

Some existing processors may have an on-board co-processor to perform some initialization tasks. For instance, server memory controllers may have interconnect built-in self test (IBIST) or Memory Scrub engines to test or zeroize memory, respectively. However, these co-processors do not perform the wake tasks, but only assist in boot from S5.

Referring now to FIG. 3A, there is shown a block diagram illustrating an exemplary server platform, according to embodiments of the invention. In one server embodiment, a platform comprises processor 301 communicatively coupled to DRAM 303a-b, an input/output Hub (IOH) 307, flash memory 305, and an input/output controller hub (ICH) 309. In this server embodiment, the north bridge (memory controller not shown) resides in the processor 301. The platform may have a trusted platform module (TPM) 311 and may be connected to an external LAN 313. The platform may also be coupled with a discrete graphics controller 315 via an external baseboard management controller (BMC) or keyboard-video-mouse (KVM) interface 317. KVM is a chip that allows multiplexing many possible local/remote keyboards/mice/video sources. In this exemplary embodiment, the IOH 307 may have additional components for TPM 302, host embedded controller interface (HECI) 304, virtual IDE (vIDE) 308, and ME controller 310a. The HECI 304 is similar to a PCI device and is the means by which the BIOS and OS may communicate with the ME 310a. The vIDE 308 enables virtual indirection to a LAN 313. The shaded area 300 indicates portions of the platform that are used by the ME controller 310a. For instance, in an embodiment, the ME controller 310a has a limited amount of ROM to store its code. In this case, the ME controller 310a accesses a partitioned, or protected, portion of the flash 305 having ME or AMT code. Resources in the ICH 309 may be required for the ME controller 310a to perform other AMT functions. The external LAN 313 may also have a separate ME controller component 310b. However, the embedded ME controller 310a has access to protected memory in the flash and may result in a system less vulnerable to attack.

The ME controller 310a or 310b may program other chips on the platform via a number of buses and communication paths within the platform. The link between the processor 301 and the IOH 307 may comprise a point to point (pTp) interconnection link, or other communication interface. The memory controller hub (MCH), or north bridge, is typically built into the processor 301 for servers, and is not shown.

In an alternative embodiment, the external BMC 317 may be used to resume from S3 using a protected storage instead of using the embedded ME 310. In this case, the BMC 317 would require an appropriate bus to be able to communicate to the platform chips to ensure appropriate configuration when running the stored boot script. However, a preferred embodiment is to utilize the ME 310a to ensure that the boot script and other information are in a hardware protected area of the flash 305.

The AMT code resides in a protected portion of flash memory 305. This portion is inaccessible to the OS and firmware (BIOS/EFI). In some embodiments, there may be a BAR register in the ICH 309. Upon boot, the BIOS sets the register in the ICH 309 to define which portions of the flash are accessible to the BIOS and which portion is accessible only to the ME 310. If the ICH BAR register indicates that a portion of the flash is inaccessible to the BIOS, the memory will be unmappable and completely invisible and inaccessible to the firmware and OS. Other methods of sequestering portions of the memory via a hardware protection scheme may be devised and used by those of skill in the art.

FIG. 3B illustrates an exemplary client platform, according to embodiments of the invention. In an exemplary client embodiment, the platform comprises a processor 321 having software agents 341 and an operating system 343. The processor 321 is communicatively coupled to DRAM 323a-c via a memory controller hub (MCH), or north bridge 327. The MCH 327 may communicate to a graphics interface 329 and an ICH 331. The ICH 331 may communicate with a hard disk drive (HDD) 333, flash memory 325 and one or more network interface devices 335a-b, for instance the Ninevah 2 Ethernet controller or the Kedron wireless LAN adapter, both available from Intel Corp. The network devices 335a-b may have an out-of-band (OOB) communications component 339. In this embodiment, the ME subsystem 337 may be built into the MCH 327. The flash memory 325 comprises the firmware code (BIOS), protected AMT code and manufacturer settings. It will be apparent to one of skill in the art that processors 301 and 321 may comprise single or multi-processors and/or may have more than one core.

The embodiment shown in FIG. 3B operates in a similar manner as that shown in FIG. 3A. Both embodiments utilize a manageability engine (ME) 310, 337 to store and retrieve boot scripts in a protected memory, for instance flash 305, 325. A resume from wake processes the boot script on the ME controller 310, 337, or sends the appropriate commands and data to the processor 301, 321 for processing by system firmware. In either case, the boot scripts are protected from tampering.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
    a processor coupled to a first memory; and
    an embedded controller communicatively coupled to the processor and having protected access to at least a portion of the first memory, the embedded controller to store and retrieve information necessary to wake the system from a sleep mode in the protected portion of the first memory, wherein neither a system firmware or operating system running on the processor have access to the protected portion of the first memory.

2. The system as recited in claim 1, wherein the embedded controller is coupled to at least one of an input output hub, a memory controller hub and a network interface.

3. The system as recited in claim 1, wherein the first memory comprises flash memory, wherein the system firmware and operating system have access to another portion of the first memory.

4. The system as recited in claim 3, wherein the embedded controller has access to a second memory comprising local system memory, and wherein the embedded processing unit stores and retrieves a wake vector in the second memory.

5. The system as recited in claim 1, wherein the information necessary to wake the system comprises memory settings, a boot script and a wake vector, wherein the boot script is to be encrypted by the embedded controller before storing the boot script and is to be decrypted by the embedded controller after retrieving the boot script from the protected portion of the first memory.

6. The system as recited in claim 5, wherein a key for encryption and decryption of the boot script is encoded in the embedded controller hardware in a write-once location.

7. The system as recited in claim 1, wherein the protected portion of the first memory is protected for use by only the embedded controller via hardware constructs of the system.

8. The system as recited in claim 1, wherein the embedded controller is to set selected chipset registers and reprogram selected system components based on the information necessary to wake the system, in response to a wake event.

9. A method comprising:
   in response to a sleep event in a platform, storing information needed to resume the platform in a memory store available to a manageability engine controller, where the memory store is inaccessible by platform firmware or operating system (OS); and
   in response to a wake event, retrieving the information needed to resume the platform, by the manageability engine, from the memory store, and then waking the platform.

10. The method as recited in claim 9, wherein the information needed to resume the platform comprises memory settings, boot scripts and a wake vector, and waking the platform further comprises:
    executing the boot scripts; and
    transitioning control to the wake vector.

11. The method as recited in claim 10, wherein, executing the boot scripts is performed on one of the manageability engine controller or a host processor on the platform, and wherein when the executing is to be performed on the host processor, the executing further comprising: sending the boot scripts to the host processor by the manageability engine controller.

12. The method as recited in claim 9, wherein the manageability engine controller resides on at least one of an input output hub, an external LAN component, a baseboard management controller (BMC), or a memory controller hub.

13. A machine readable storage medium having instructions stored therein that when executed on a machine cause the machine to:
    in response to a sleep event in a platform, store information needed to resume the platform in a memory store available to a manageability engine controller, where the memory store is inaccessible by platform firmware or operating system (OS); and
    in response to a wake event, retrieve the information needed to resume the platform, by the manageability engine, from the memory store, and then wake the platform.

14. The medium as recited in claim 13, wherein the information needed to resume the platform comprises memory settings, boot scripts and a wake vector, and waking the platform further comprises instructions to:
    execute the boot scripts; and
    transition control to the wake vector.

15. The medium as recited in claim 14, wherein, executing the boot scripts is to be performed on one of the manageability engine controller or a host processor on the platform, and wherein when the executing is to be performed on the host processor, further comprising instructions to: send the boot scripts to the host processor by the manageability engine controller.

16. The method as recited in claim 13, wherein the manageability engine controller resides on at least one of an input output hub, an external LAN component, a baseboard management controller (BMC), Or a memory controller hub.

* * * * *